United States Patent [19]
Bofill

[11] Patent Number: 4,476,962
[45] Date of Patent: Oct. 16, 1984

[54] DISC BRAKE HAVING A SLIDING YOKE

[75] Inventor: Joaquim F. Bofill, Barcelona, Spain

[73] Assignee: Bendiberica S.A., Barcelona, Spain

[21] Appl. No.: 450,506

[22] Filed: Dec. 16, 1982

[51] Int. Cl.$^3$ ............................................ F16D 55/224
[52] U.S. Cl. .................................. 188/71.1; 188/73.47
[58] Field of Search .................... 188/71.1, 72.5, 73.31, 188/73.39, 73.45, 73.47

[56] References Cited

U.S. PATENT DOCUMENTS

| 3,384,203 | 5/1968 | Walther et al. | 188/73.47 X |
| 3,602,328 | 8/1971 | Fannin et al. | 188/73.47 X |
| 3,944,028 | 3/1976 | Haraikawa | 188/72.5 |

FOREIGN PATENT DOCUMENTS

| 2309758 | 11/1976 | France | 188/73.47 |
| 2436911 | 4/1980 | France | |

Primary Examiner—Duane A. Reger
Attorney, Agent, or Firm—Larry J. Palguta; Paul D. Schoenle; Ken C. Decker

[57] ABSTRACT

The brake has a sliding yoke (14) in the form of a closed framed structure surrounding the stationary support of the brake and straddling the disc, the outer part (52) of the yoke being connected to the inner part (51) by at least one axially extending elongated reinforcing member (62) arranged radially beyond the periphery of the disc (12), the outer part (52) of the yoke biasing the outer pad (34) at two zones (54, 56) located radially on both sides of the pressure center of the brake hydraulic motor (24).

7 Claims, 6 Drawing Figures

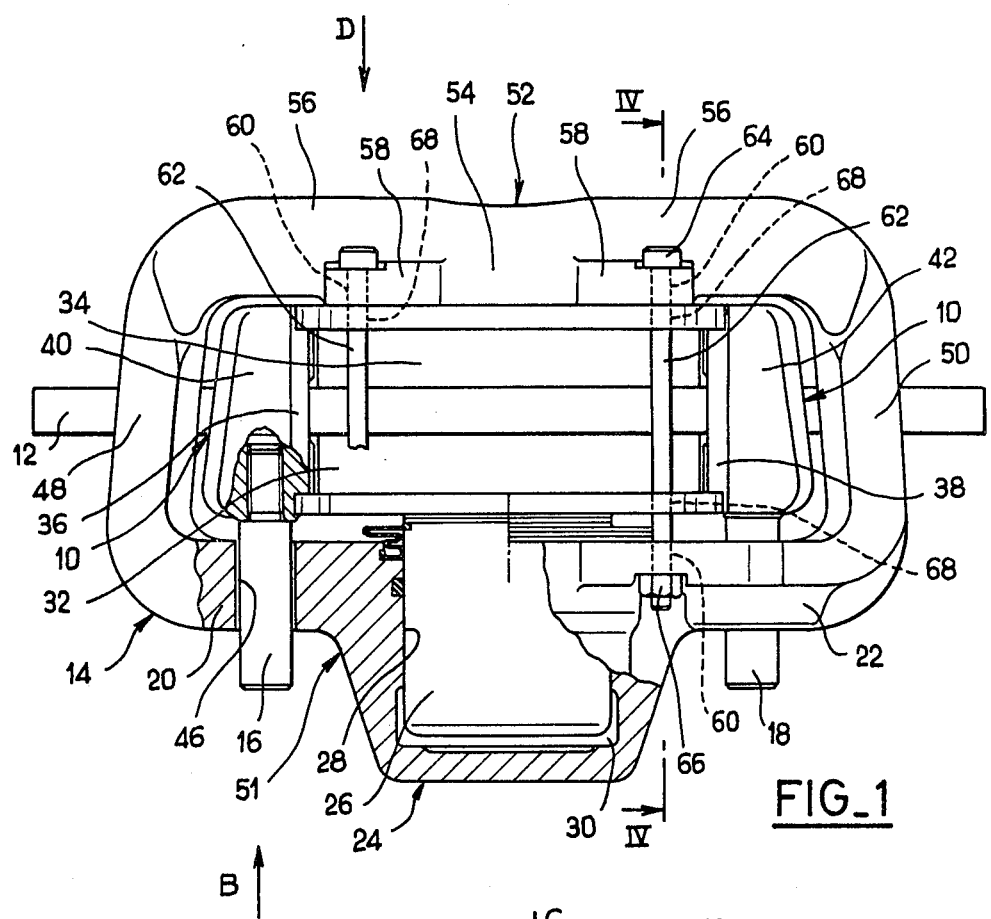
FIG_1
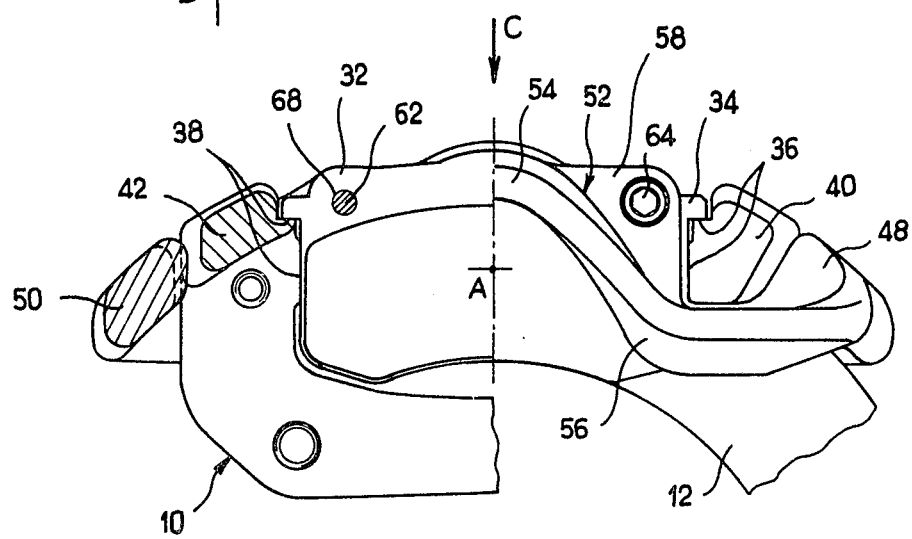
FIG_2

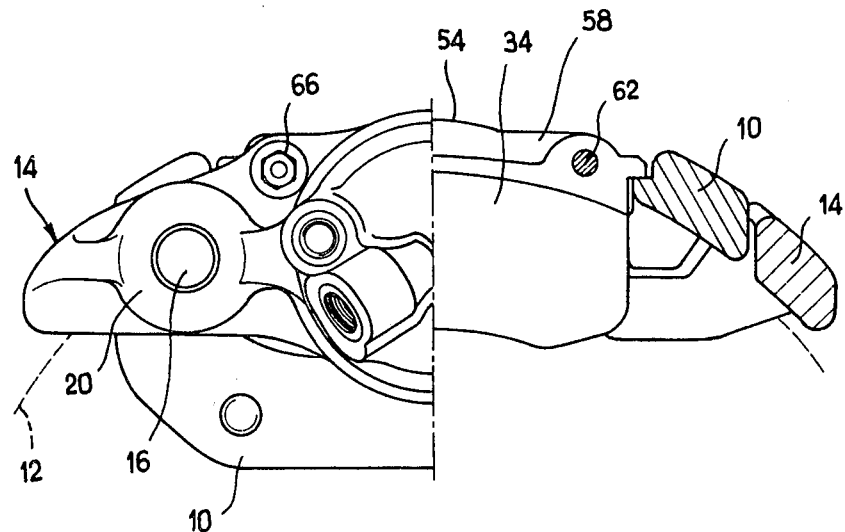
FIG_3
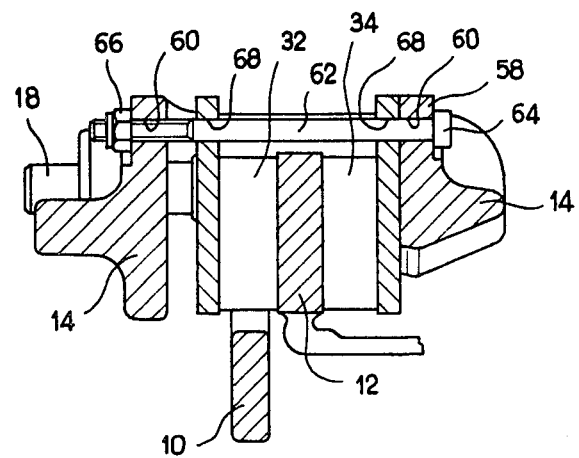
FIG_4

DISC BRAKE HAVING A SLIDING YOKE

The invention refers to a disc brake having a sliding yoke or caliper, more particularly for automotive vehicles.

The invention more particularly concerns a disc brake, the yoke of which is slidingly mounted by means of at least an axially extending pin on a stationary support within which are anchoringly and slidingly mounted two friction members adapted to come into friction engagement with the opposite faces of a rotating disc upon actuation of a brake motor acting directly onto one of said friction members and indirectly onto the other friction member by reaction through the sliding yoke, the pin extending through bores formed in axially mating relationship in the stationary support and the yoke.

Usually, in the brakes of said class, the friction member which is urged or biased by reaction through the sliding, yoke, is applied onto the corresponding face of the disc by means of a rest portion of said yoke which extends substantially at a right angle with respect to an intermediary vault portion of the yoke extending over the disc. The rest portion of the yoke which reactingly urges the friction member is operated in a substantially cantilevered manner, and in operation, is subject to a tilting torque, its connection with the vault portion being located radially beyond the periphery of the disc, i.e. beyond the pressure center of the brake motor. Such an arrangement induces a radial wear on said friction member, the more as closer to the periphery of the disc, this being due to the spreading flexure of the rest portion. Moreover, when releasing the brake, the rest portion is no more flexingly solicitated and the portion of the friction member which is remote from the periphery of the disc comes into bearing contact with said latter. In order to limit said drawbacks, the vault portion of the yoke extending over the disc and the connection zone between the vault portion and the rest portion have to be reinforced and heavily dimensioned for limiting the bending of the rest portion, whereby leading to a weight increase of the brake.

There is an object of the invention to provide a sliding yoke disc brake of compact and light configuration avoiding the above-mentioned drawbacks.

In order to meet these objects and others, there is provided a disc brake of the above class wherein the yoke is in the form of a closed frame arranged around the stationary support and comprises at least one axially extending elongated reinforcing member arranged radially beyond the periphery of the disc and interconnecting a first part of the yoke located on the side of the brake motor and an opposed second part of the yoke intended to urge the other friction member at a first zone more remote radially outwardly than the pressure center of the brake motor with respect to the axis of the disc, said other friction member being also urged by said second part of the yoke at a second zone less remote radially outwardly than said pressure center of the brake motor.

With such an arrangement, the (outer) friction member reactingly applied onto the disc is urged by the second part of the yoke at the level of two zones, one (said second zone) located below the pressure center of the brake motor and the other (said first zone) located above said pressure center of the brake motor, said latter (first zone) being held by said elongated reinforcing member to be prevented from flexing or spreadingly bending when the brake is applied.

There is an other object of the invention to provide a disc brake making use of said axially extending elongated reinforcing member as a guiding axis for the friction members.

Two embodiments of the brake in accordance with the invention will now be described by referring to the attached drawings, in which:

FIG. 1 is a top view of a disc brake according to the invention;

FIG. 2 is a front view of the disc brake of FIG. 1, half in cross-section;

FIG. 3 is an inner front view of the disc brake of FIG. 1, half in cross-section;

FIG. 4 is a cross-section along line IV—IV of FIG. 1;

DETAILED DESCRIPTION OF THE DRAWINGS

Figure 5:
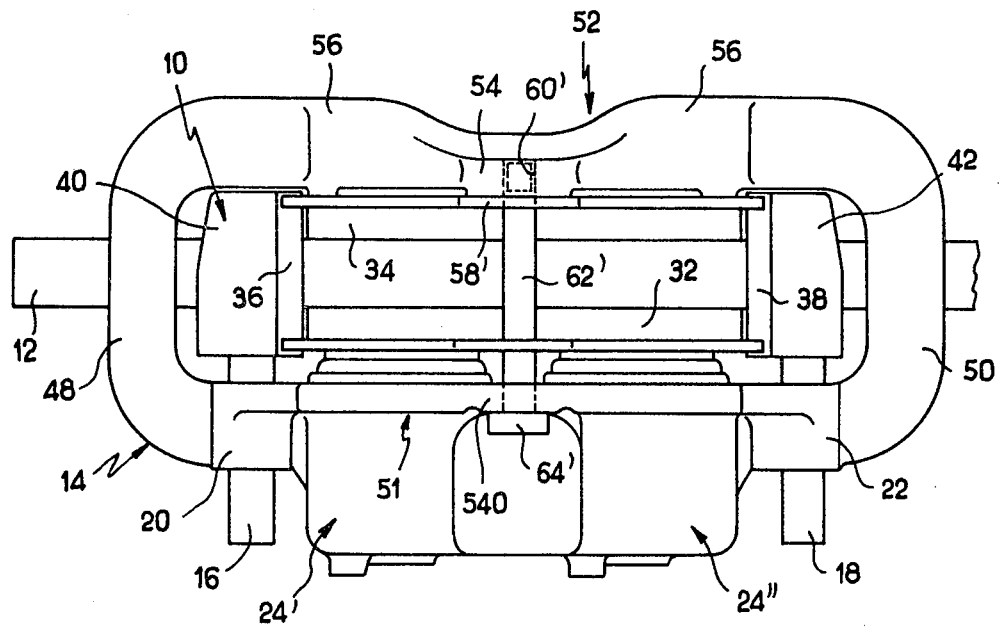
FIG. 5 is a top view similar to FIG. 1 showing a second embodiment of the invention.

In the embodiment illustrated in FIGS. 1 to 4, the disc brake comprises a stationary support 10 designed to be mounted onto a stationary part of a vehicle (not shown), in the form of a substantially U-shaped platen, arranged adjacent a disc 12 rotatingly connectable to a wheel of the vehicle (not shown). The stationary support 10 slidingly supports, by means of two circumferentially spaced axially extending pins 16 and 18, a movable yoke 14 straddling the disc. The axes of the pins 16 and 18 are substantially parallel to the axis of rotation of the disc 12 and the pins 16 and 18 are disposed between the stationary support 10 and inner lateral arms 20 and 22 of the yoke 14. The yoke 14 comprises actuating means constituted by an hydraulic brake motor 24 (see FIG. 1) comprising a piston 26 slidingly received within a bore 28 formed in the yoke and responsive to the pressure prevailing in a control chamber 30 connectable to a pressure source such as the master cylinder of the vehicle (not shown). The piston 26 is arranged so as to directly urge a first or inner friction member 32 against a first face of the disc 12 when fluid under pressure is fed into chamber 30. By reaction, the sliding caliper 14 is able to be axially slidingly moved on the pins 16 and 18 so as to urge the second or outer friction member 34 against the opposite face of the disc 12. As best seen in FIGS. 1 and 2, the inner friction member 32 is slidingly and anchoringly supported onto facing circumferentially spaced axially extending edges 36 and 38 formed innerly on the axially extending lateral arms 40 and 42, respectively, of the stationary support 10. Similarly, the outer friction member 34 is also anchoringly and slidingly supported onto the stationary support 10.

As best seen in FIG. 1, both pins 16 and 18 are associated to the stationary support 10 by a thread connection. In the illustrated embodiment, the pins, which slidingly support the yoke 14, are screwed into the stationary support 10, the inner lateral arms 20 and 22 of the yoke 14 being provided with axially extending bores 46 within which are received the pins 16 and 18.

According to the invention, as best seen in FIG. 1, the yoke 14 has the shape of a non-plane closed frame structure arranged around the stationary support 10 and straddling the disc 12 by means of two circumferentially spaced lateral arms 48 and 50 which extend substantially axially on both sides laterally of the lateral arms 40 and 42 of the stationary support 10. The lateral arms 48 and 50 of the yoke 14 are interconnected innerly by a first or inner part 51 of the yoke which includes the brake motor 24, and outwardly by a second or outer part 52 which closes the yoke and which is designed to urge axially inwardly the outer friction member 34.

Referring now to FIG. 2, the second or outer part 52 of the yoke 14 comprises a first central urging zone 54 more remote radially outwardly, with respect to the axis of the disc, then the pressure center of the brake motor indicated by point A on FIG. 2. The second part 52 of the yoke 14 also comprises at least a second urging zone 56 which in turn additionally urges the outer friction member 34 at a zone less remote radially than the pressure center A of the brake motor. Typically, the second or outer part 52 of the yoke comprises two urging zones 56 arranged symmetrically with respect to the symmetry plane of the brake (median planes of the figures).

The first zone 54 is prolongated laterally on both sides of the symmetry plane by two laterally extending opposite lugs 58 within which are formed axial openings 60. In the first part 51 of the yoke 14 are also formed axial openings 60 in axially mating relationship with those of the second part 52 of the yoke 14. Two bolts 62 are mounted within said openings 60 so as to extend axially above the periphery of the disc 12. Each bolt 62 has at one end a flared portion 64 forming a bolt head in bearing engagement with the lugs 58, and, at the other end, a threaded portion onto which is screwed a nut 66 which is in turn in bearing engagement with the first part 51 of the yoke. According to a feature of the invention, the support plate of the friction members 32 and 34 comprises openings 68 through which extend the bolts 62 which accordingly advantageously form guiding axes for said friction members.

It can be easily understood that the bolts 62 assume the function of axially extending reinforcing spacer members for the second, e.g. outer part 52 of the yoke 14 and more particularly prevent the central outwardly extending zone 54 from spreadingly bending when the brake is applied.

The mounting of the yoke 14 onto the stationary support 10 is achieved as follows:

The yoke 14 is placed around the stationary support 10 as illustrated in FIG. 1. When the bores 46 of the yoke 14 are in mating relationship with the threaded bores formed in the stationary support, the pins 16 and 18 are introduced within the bores 46 in the direction of arrow B and then screwed into the stationary support by means of a convenient tool (not shown). The friction members 32 and 34 are then put in place by being introduced between the lateral arms 40 and 42 of the stationary support 10 in the direction of arrow C in FIG. 2. When said friction members are in bearing engagement with the sliding surfaces 38 of said lateral arms, the bolts 62 are introduced in the direction of arrow D in FIG. 1 through the openings 60 of the yoke 14 and the openings 68 formed in the support plate of the friction members. The nuts 66 are tightened onto the bolts 62 by means of a convenient tool (not shown). The nuts 66 are tightened onto the bolts 62 so as to pre-stress said latter to ensure their reinforcing function.

Thus, when the brake is applied, the second or outer part 52 of the yoke is held with respect to the first or inner part 51, on one hand by means of the lateral arms 48 and 50 of the yoke, and on the other hand, by means of the bolts 62 which prevent said second part to be bent. Resulting wear in operation of outer friction member 34 is even and, when the brake is released, there is no residual torque due to an uneven wear in the radial direction of said friction member.

It will be appreciated that the nuts 66 may be substituted by a thread formed innerly in the bores 60 of the first or inner part 51 of the yoke. Tightening of the bolts 62 is thus carried out by means of the head forming-flared portion 64 which is maneuvered by a convenient tool (not shown).

Figure 6:
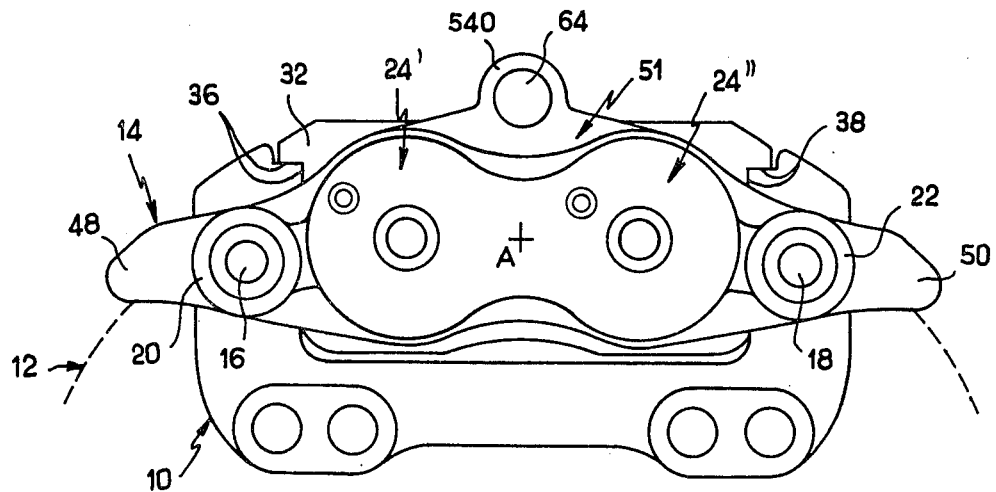
FIG. 6 is an inner front view of the brake of FIG. 5.

The embodiment illustrated in FIGS. 5 and 6 is generally identical to the embodiment which has been disclosed in the above. In addition to the fact that said brake comprises two parallel brake motors 24' and 24" arranged symmetrically with respect to the symmetry plane of the brake first to define a mean pressure center A similar to the one previously described, said embodiment essentially differs from the preceding one in that there is provided only a single central bolt 62' which is received within a bore 60' of the first radially raised central zone 54 of the second, e.g. outer part 52 of the yoke 14. Coincidentally, the first, e.g. inner part 51 of the yoke comprises, between the two brake motors, a central raised portion 540 extending radially outwardly beyond the periphery of the disc 12 for receiving the other end of the bolt 62'. In the illustrated embodiment, as previously mentioned, the threaded end portion of the bolt 62' is screwed within the tapered bore 60' of the central protruding tab 54. The bolt 62' may only extend above the upper end of the friction members 32 and 34 so as to radially holding same; however, as in the preceding embodiment, the bolts 62' may serve for guiding the friction members 32 and 34 by providing each of said friction member with a central radially outwardly protruding tab analogous to the opposite central raised zones 54 and 540 of the yoke and formed with a transversing axial hole for receiving the bolt.

Although disclosed in relation with preferred embodiments, the present invention is not limited thereto but may also include modifications and changes which will appear to those skilled in the art. More particularly, when required, it is possible to provide the brake yoke with three triangularly distributed or substantially aligned bolts. Further alternative embodiments for mounting cylindrical or prismatic elongated reinforcing members can be contemplated.

I claim:

1. A disc brake including a yoke (14) slidingly supported, by means of at least one axially extending pin (16; 18), onto a stationary support (10) within which are anchoringly and slidingly received two friction members (32, 34) adapted to come into friction engagement with the opposite faces of a rotating disc (12) upon actuation of actuating means constituted by at least a brake motor (24, 24', 24") acting directly onto one (32) of said friction members and indirectly onto the other (34) of said friction members by reaction through said sliding yoke (14), said pins (16, 18) extending into bores (46) formed in axially mating relationship in said stationary support (10) and in said yoke (14), wherein said yoke (14) is in the form of a closed frame disposed around said stationary support (10) and includes at least one elongated axially extending reinforcing member (62, 62') arranged radially beyond the periphery of said disc (12) and interconnecting a first part (51) of said yoke on the side of said brake motor (24) and an opposite second part (52) of said yoke (14) adapted to urge said other (34) friction member at a first zone (54) more remote radially outwardly than the pressure center (A)

of said brake motor, said other (34) friction member being also urged by said second part (52) of said yoke at a second zone (56) less remote radially outwardly than said pressure center (A) of said brake motor.

2. A disc brake according to claim 1, wherein said reinforcing member (62, 62') is formed of a cylindrical member, the ends of which cooperate with said first part (51) and said second part (52) of said yoke (14), respectively.

3. A disc brake according to claim 2, wherein said reinforcing member (62, 62') is releasably connected to said first (51) and second (52) parts of said yoke (14).

4. A disc brake according to claim 3, wherein said reinforcing member (62, 62') extends into orifices (60, 60') formed in axially mating relationship within said first (51) and second (52) parts of said yoke (14), and comprises, at one end, a rest head (64, 64') and, at the other end, a threaded portion.

5. A disc brake according to claim 4, wherein said reinforcing member (62, 62') extends through openings (68) formed in said friction members (32, 34).

6. A disc brake according to claim 4 or claim 5, including one said reinforcing member (62') extending substantially in the symmetry plane of said brake.

7. A disc brake according to claim 4 or to claim 5, including a pair of said reinforcing members (62) disposed symmetrically with respect to the symmetry plane of said brake.

* * * * *